United States Patent
Saitoh et al.

(10) Patent No.: US 11,813,678 B2
(45) Date of Patent: Nov. 14, 2023

(54) CUTTING INSERT AND INDEXABLE CUTTING TOOL

(71) Applicant: Mitsubishi Hitachi Tool Engineering, Ltd., Tokyo (JP)

(72) Inventors: Hiroto Saitoh, Narita (JP); Syoujirou Touma, Narita (JP)

(73) Assignee: MOLDINO TOOL ENGINEERING, LTD., Tokyo (JP)

( * ) Notice: Subject to any disclaimer, the term of this patent is extended or adjusted under 35 U.S.C. 154(b) by 173 days.

(21) Appl. No.: 16/499,415

(22) PCT Filed: Oct. 30, 2018

(86) PCT No.: PCT/JP2018/040393
§ 371 (c)(1),
(2) Date: Sep. 30, 2019

(87) PCT Pub. No.: WO2019/088125
PCT Pub. Date: May 9, 2019

(65) Prior Publication Data
US 2020/0023444 A1 Jan. 23, 2020

(30) Foreign Application Priority Data
Nov. 2, 2017 (JP) ................................. 2017-213262

(51) Int. Cl.
B23C 5/06 (2006.01)
B23C 5/20 (2006.01)

(52) U.S. Cl.
CPC ............... *B23C 5/06* (2013.01); *B23C 5/202* (2013.01); *B23C 2200/0483* (2013.01);
(Continued)

(58) Field of Classification Search
CPC .......... B23C 5/207; B23C 5/202; B23C 5/20; B23C 5/06; B23C 2200/208;
(Continued)

(56) References Cited

U.S. PATENT DOCUMENTS

2007/0071559 A1* 3/2007 Koskinen ................ B23B 27/16
407/34
2010/0034602 A1* 2/2010 Sung ........................ B23C 5/06
407/113

(Continued)

FOREIGN PATENT DOCUMENTS

CN 102802855 A 11/2012
CN 203610753 U 5/2014
(Continued)

OTHER PUBLICATIONS

Notice of Allowance dated Nov. 9, 2020, issued for Korean Patent Application No. 10-2019-7030269 and English translation thereof.
(Continued)

*Primary Examiner* — Ryan Rufo
(74) *Attorney, Agent, or Firm* — Locke Lord LLP

(57) ABSTRACT

A cutting insert includes a polygonal plate-shaped insert main body having two polygonal surfaces, a side surface having a flank, and a cutting edge to be formed in an intersection ridgeline portion between a rake face and the flank. The insert main body has a rotationally symmetrical shape with respect to an insert center line, and has a front-rear reversely symmetrical shape with respect to the polygonal surface. The cutting edge includes a corner cutting edge, a major cutting edge extending from an one end of the corner cutting edge, and a wiper cutting edge extending from an one end of the major cutting edge in a direction intersecting the major cutting edge at an obtuse angle. A first region is disposed where a clearance angle of the flank
(Continued)

gradually decreases to a negative angle after continuously passing through 0° from a positive angle.

9 Claims, 10 Drawing Sheets

(52) U.S. Cl.
CPC .... *B23C 2200/208* (2013.01); *B23C 2200/28* (2013.01); *B23C 2200/293* (2022.02)

(58) Field of Classification Search
CPC .... B23C 2200/0483; B23C 2200/0477; B23C 2200/0411
See application file for complete search history.

(56) References Cited

U.S. PATENT DOCUMENTS

| | | | | |
|---|---|---|---|---|
| 2010/0080662 | A1* | 4/2010 | Satran | B23C 5/2213 407/40 |
| 2010/0266353 | A1 | 10/2010 | Zitzlaff et al. | |
| 2011/0293381 | A1* | 12/2011 | Saji | B23C 5/109 407/40 |
| 2012/0009029 | A1* | 1/2012 | Saji | B23C 5/202 407/103 |
| 2013/0004251 | A1 | 1/2013 | Hausmann et al. | |
| 2013/0129430 | A1* | 5/2013 | Bhagath | B23B 27/145 407/100 |
| 2013/0294850 | A1* | 11/2013 | Park | B23C 5/109 407/47 |
| 2014/0178135 | A1* | 6/2014 | Yamamoto | B23C 5/202 407/42 |
| 2014/0334890 | A1* | 11/2014 | Takahashi | B23C 5/2213 407/114 |
| 2017/0008099 | A1* | 1/2017 | Touma | B23C 5/202 |
| 2017/0291231 | A1* | 10/2017 | Mao | B23C 5/109 |
| 2019/0015911 | A1* | 1/2019 | Hagiwara | B23C 5/202 |
| 2019/0314906 | A1* | 10/2019 | Mihalik | B23C 5/06 |

FOREIGN PATENT DOCUMENTS

| | | | |
|---|---|---|---|
| CN | 105764640 A | | 7/2016 |
| EP | 2559509 A1 | | 2/2013 |
| EP | 2559509 B1 | | 12/2014 |
| EP | 3100811 A1 | | 12/2016 |
| JP | 3314512 B | | 8/2002 |
| JP | 2003-275920 A | | 9/2003 |
| JP | 2009-226576 A | | 10/2009 |
| JP | 2010069578 A | * | 4/2010 |
| JP | 2010-523352 A | | 7/2010 |
| JP | 2013-121639 A | | 6/2013 |
| JP | 2013-176834 A | | 9/2013 |
| JP | 5983901 B1 | | 9/2016 |
| WO | 94/16849 A1 | | 8/1994 |
| WO | 2016/080486 A1 | | 5/2016 |
| WO | WO-2016080486 A1 * | 5/2016 | ............... B23C 5/20 |
| WO | 2017/051471 A1 | | 3/2017 |
| WO | 2017/122715 A1 | | 7/2017 |

OTHER PUBLICATIONS

Office Action dated Dec. 3, 2019, issued for the Chinese patent application No. 201880005121.1 and a partial English translation of the Search Report.
International Search Report dated Dec. 25, 2018, issued for PCT/JP2018/040393 and English translation thereof.
Supplementary European Search Report dated Feb. 14, 2022, issued for European Patent Application No. 18873349.7.

* cited by examiner

CUTTING INSERT AND INDEXABLE CUTTING TOOL

TECHNICAL FIELD

The present invention relates to a cutting insert suitable for performing high-feed milling by being detachably attached to an indexable cutting tool such as an indexable end mill, and an indexable cutting tool to which the cutting insert is detachably attached.

Priority is claimed on Japanese Patent Application No. 2017-213262, filed on Nov. 2, 2017, the content of which is incorporated herein by reference.

BACKGROUND ART

For example, as the cutting insert for performing the high-feed milling in this way, Patent Document 1 discloses a triangular plate-shaped cutting insert having two triangular surfaces 2 formed in two substantially triangular shapes in which an insert main body 1 includes three corner portions as illustrated in FIG. 12. In addition, Patent Document 1 also discloses an indexable cutting tool to which the cutting insert is detachably attached as follows. One triangular surface 2 of the cutting insert is set to a rake face so as to be directed to a tool rotation direction. A corner cutting edge 3 formed in one corner portion of the one triangular surface 2 is directed to an outer peripheral side (right side in FIG. 12) of a tool main body. A major cutting edge 4 extending from an one end of the corner cutting edge 3 is directed to a tip outer peripheral side of the tool main body. Furthermore, a minor cutting edge (wiper cutting edge) 5 extending from an one end of the major cutting edge 4 is substantially located on a plane perpendicular to a rotation axis of the tool main body.

According to the cutting insert configured in this way, the major cutting edge 4 is directed to a tip side of the tool main body, and is directed to a rear end side at a gentle angle with respect to the plane perpendicular to the rotation axis as the major cutting edge 4 is directed toward the outer peripheral side of the tool main body. Due to the major cutting edge 4, a thin chip is generated in an inner peripheral side (left side In FIG. 12) of the tool main body of the major cutting edge 4 or the above-described wiper cutting edge 5. Therefore, even if the tool main body is fed at a high feeding rate, an increase in cutting resistance can be prevented, and thus, cutting can be efficiently carried out during molding work.

CITATION LIST

Patent Document

[Patent Document 1] Japanese Patent No. 5983901

SUMMARY OF INVENTION

Technical Problem

However, according to the cutting insert disclosed in Patent Document 1, as illustrated in FIGS. 6 and 10 in Patent Document 1, a clearance angle of a flank at a position of the above-described wiper cutting edge 5 is 0°. In addition, each flank of the major cutting edge 4 or the corner cutting edge 3 other than the wiper cutting edge 5 is separated from the major cutting edge 4 and the corner cutting edge 3. The flank is convexly curved so as to protrude outward of the insert main body 1 as the flank is directed to an opposite triangular surface, and the clearance angle becomes a negative angle.

Here, a reference numeral A in FIG. 13 represents an example as follows. In the cutting insert disclosed in Patent Document 1 illustrated in FIG. 12, a cross section passing through an end portion of the wiper cutting edge 5 on a side opposite to the major cutting edge 4 along an insert center line L passing through a center of the triangular surface 2 serving as the rake face is set as a reference position of 0°. The clearance angle is calculated for every 5° in the cross section along the insert center line L from a reference cross section thereof to an end portion of the other wiper cutting edge 5 located at a position of 120° in a counterclockwise direction around the insert center line L in FIG. 12. As will be understood from FIG. 13, the above-described clearance angle is 0° in a region of the wiper cutting edge 5. If the clearance enters a region of the major cutting edge 4 (region having a cross-sectional angle of 15° or larger), the clearance angle gradually increases to the negative angle side. The above-described clearance angle returns to 0° again at a position beyond the corner cutting edge 3 (position having the cross-sectional angle of 70°).

Therefore, in order to avoid a possibility that the flanks may interfere with a processing surface of a work material, the cutting insert has to be attached as follows. The triangular surface 2 serving as the rake face is greatly inclined to a side in the tool rotation direction as the triangular surface 2 is directed to the rear end side of the tool main body from the wiper cutting edge 5 or the major cutting edge 4 to be directed to the tip side of the tool main body. Therefore, the rake angle in an axial direction of the wiper cutting edge 5 or the major cutting edge 4 becomes the negative angle or a large angle to the negative angle side. Consequently, it is inevitable that cutting quality is unsatisfactory. Therefore, even if a thickness of the chip is thin, it is no longer possible to sufficiently prevent an increase in cutting resistance, thereby causing a possibility that processing accuracy may become poor due to chattering vibration or deflection of the tool main body during the high-feed milling. In addition, the chip is forcibly curled, thereby causing a possibility of chip clogging.

The present invention is made under this background, and an object thereof is to provide a cutting insert which can reliably prevent an increase in cutting resistance during high-feed milling, which can achieve excellent processing accuracy, and which can prevent chip clogging, and to provide an indexable cutting tool to which this cutting insert can be detachably attached.

Solution to Problem

According to the present invention, a cutting insert is provided, including a polygonal plate-shaped insert main body having two polygonal surfaces formed in a polygonal shape, one of the two polygonal surfaces serving as a seating surface when the other of the two polygonal surfaces serves as a rake face, a side surface located around the two polygonal surfaces and having a flank which intersects the rake face of the polygonal surface, and a cutting edge formed in an intersection ridgeline portion between the rake face and the flank. The insert main body has a rotationally symmetrical shape with respect to an insert center line passing through a center of the two polygonal surfaces, and has a front-rear reversely symmetrical shape with respect to the two polygonal surfaces. The cutting edge includes at least a corner cutting edge located in a corner portion of the polygonal surface, a major cutting edge extending from an one end of the corner cutting edge, and a wiper cutting edge extending from an one end of the major cutting edge in a direction intersecting the major cutting edge at an obtuse angle. A first region (gradually decreasing region of flank) is disposed in a range leading to the major cutting edge from the wiper cutting edge toward a side of the one end of the corner cutting edge. In the first region, a clearance angle of the flank in a cross section taken along the insert center line gradually decreases to a negative angle after continuously passing through 0° from a positive angle, as the flank is directed from the wiper cutting edge toward the side of the one end of the corner cutting edge.

In addition, in the indexable tool according to the present invention, the cutting insert is detachably attached to the insert mounting seat formed in a tip outer periphery of the tool main body rotated around the axis. The cutting insert is directed to the tool rotation direction by using one polygonal surface of the two polygonal surfaces as the rake face, and one of the corner cutting edges of the one polygonal surface is directed to the outer peripheral side of the tool main body. One of the major cutting edges extending from the one end of one of the corner cutting edges is directed to the tip side of the tool main body. Furthermore, one of the wiper cutting edges extending from the one end of one of the major cutting edges is located so that the concavity angle is 2° or smaller with respect to the plane perpendicular to the axis.

In the cutting insert and the indexable cutting tool, the first region in which the clearance angle of the flank in the cross section taken along the insert center line gradually decreases to the negative angle after continuously passing through 0° from the positive angle as the flank is directed from the wiper cutting edge toward the side of the one end of the corner cutting edge is disposed in the range leading to the major cutting edge from the wiper cutting edge of the cutting insert toward the side of the one end of the corner cutting edge. That is, until the clearance angle becomes 0° from the wiper cutting edge toward the side of the one end of the corner cutting edge, the clearance angle in the cross section taken along the insert center line of the wiper cutting edge and the major cutting edge is the positive angle.

Therefore, in the indexable cutting tool, even if one polygonal surface serving as the rake face is not greatly inclined to a side in the tool rotation direction toward the rear end side of the tool main body from the portion on the inner peripheral side of the tool main body of the wiper major cutting edge and the major cutting edge which are directed to the tip side of the tool main body, it is possible to avoid the flank on the inner peripheral side of the tool main body of the wiper cutting edge and the major cutting edge from interfering with the processing surface of the work material. Therefore, it is possible to ensure sharp cutting quality in the portion on the inner peripheral side of the tool main body of the wiper cutting edge and the major cutting edge, and it is possible to reliably suppress an increase in cutting resistance. Accordingly, it is possible to obtain excellent processing accuracy by preventing chattering vibration or deflection of the tool main body in high-feed milling In addition, since the chip is not forcibly curled, chip clogging can be prevented.

On the other hand, the thick chip is generated contrary to the inner peripheral side, on a side of the corner cutting edge of the major cutting edge directed to the outer peripheral side of the tool main body. Accordingly, a cutting load applied to the cutting edge increases. In contrast, in the cutting insert and the indexable cutting tool according to the above-described configuration, the clearance angle of the flank in the cross section taken along the insert center line on the side of the corner cutting edge of the major cutting edge gradually decreases to the negative angle side from 0°. Therefore, as a result, a lip angle of the major cutting edge gradually increases toward the corner cutting edge. Accordingly, the cutting edge strength can be sufficiently ensured against a heavy cutting load. Thus, it is possible to prevent chipping or damage from occurring in the cutting edge.

In the first region, it is desirable that the clearance angle of the flank in the cross section taken along the insert center line gradually decrease within a range of +8° to −6°. At a position which bisects a cutting edge length of the wiper cutting edge, it is desirable that the clearance angle of the flank in the cross section taken along the insert center line fall within a range of +0.5° to +8°. If the clearance angle of the first region or the clearance angle at the position which bisects the cutting edge length of the wiper cutting edge exceeds the above-described range, the lip angle of the cutting edge decreases. Consequently, even in a case where a thin chip is generated, there is a possibility that chipping or damage is likely to occur. On the other hand, if the clearance angle falls below the above-described range, unless the insert main body is greatly inclined, it is not possible to prevent interference between the flank and the work material, thereby causing a possibility that the cutting resistance may increase. In the first region, it is more desirable that the clearance angle of the flank in the cross section taken along the insert center line gradually decrease within a range of +7° to −5°. It is much more desirable that the clearance angle gradually decrease within a range of +6° to −4°. However, the configuration is not limited thereto. Similarly, at the position which bisects the cutting edge length of the wiper cutting edge, it is more desirable that the clearance angle of the flank in the cross section taken along the insert center line fall within a range of +0.5° to +7°. It is much more desirable that the clearance angle fall within a range of +0.5° to +6°. However, the configuration is not limited thereto.

Incidentally, the indexable cutting tool having this cutting insert attached thereto is used in performing high-feed milling in which the tool main body is fed in the direction perpendicular to the axis while the tool main body is rotated around the axis. In addition to the high-feed milling, the indexable cutting tool is also used for ramping milling in which the work material is engraved by feeding the tool main body to the tip side in the axial direction. Then, in this case, a portion adjacent to the inner peripheral side of the tool main body of the wiper cutting edge, that is, a portion within a range where the angle of the cross-sectional position with regard to the corner cutting edge 3 on the upper side in FIG. 12 is approximately 85° to 120° is also used for the cutting. However, according to the cutting insert disclosed in Patent Document 1, as illustrated in FIG. 13, the clearance angle in the cross section taken along the insert center line of the flank in this portion is also 0°. Accordingly, if the cutting insert is not greatly inclined, it is not possible to avoid the interference between the flank and the processing surface of the work material, thereby resulting in an increase in the cutting resistance.

In this case, in the cutting insert according to the above-described configuration, it is desirable to adopt the following configuration. The cutting edge further includes a minor cutting edge extending from an other end of the corner cutting edge in a direction intersecting the wiper cutting edge of an other cutting edge adjacent to a side of the other end of the corner cutting edge, at the obtuse angle. In the minor cutting edge, a second region (gradually increasing region of clearance angle) is disposed in a range extending from the other end of the corner cutting edge. In the second region, the clearance angle of the flank in the cross section taken along the insert center line gradually increases to the positive angle side, as the flank is separated from the other end of the corner cutting edge. A third region (stable region of clearance angle) is disposed in a range directed to a side of the other cutting edge from the second region. In the third region, the clearance angle of the flank in the cross section taken along the insert center line is the positive angle. A change rate of the clearance angle for each unit nipping angle interposing the insert center line in the third region is lower than a change rate in the first region and the second region.

According to this configuration, in the minor cutting edge located on the inner peripheral side of the tool main body of the wiper cutting edge used for the cutting, first, the clearance angle of the flank in the cross section taken along the insert center line in the second region gradually increases to the positive angle side, as the minor cutting edge is directed to a side of the wiper cutting edge used for the cutting by being separated from the other end of the corner cutting edge located on the inner peripheral side of the tool main body. Subsequently, in the third region, while the clearance angle is maintained on the positive angle side, the clearance angle is stabilized in a range where the change rate of the clearance angle for each unit nipping angle is lower than the change rate in the first region and the second region. Therefore, in the portion of the minor cutting edge adjacent to the inner peripheral side of the tool main body of the wiper cutting edge during the ramping milling, the clearance angle is stabilized at the positive angle in the third region. Accordingly, the cutting insert does not have to be greatly inclined, which does not result in the increase in the cutting resistance.

In addition, particularly in this case, the clearance angle of the flank in the cross section taken along the insert center line of the wiper cutting edge is caused to decrease to the negative angle side, compared to the clearance angle of the flank in the cross section along the insert center line in the third region. In this manner, the cutting edge strength can be maintained by securing the lip angle of the wiper cutting edge. In the third region as well, in order to compatibly achieve the secured lip angle of the minor cutting edge and the reduced cutting resistance, it is desirable that the clearance angle of the flank in the cross section taken along the insert center line of the minor cutting edge fall within a range of +6° to +15°. In particular, if the clearance angle exceeds +15°, there is a possibility that stress may be concentrated on the minor cutting edge intersecting the wiper cutting edge at the obtuse angle. Accordingly, it is not preferable. It is more desirable that the clearance angle fall within a range of +7° to +14°, and much more preferable that the clearance angle fall within a range of +8° to +13°. However, the configuration is not limited thereto.

Furthermore, in a case where the third region is disposed in this way, it is desirable to adopt the following configuration. The polygonal surface has a planar portion perpendicular to the insert center line, and an inclined portion inclined so as to protrude in a direction of the insert center line, as the inclined portion is directed from the planar portion toward the side of the corner cutting edge. In the cutting edge, the corner cutting edge, the major cutting edge, and a portion located in the second region of the minor cutting edge is formed in the intersection ridgeline portion between the inclined portion and the flank. In contrast, a portion located in the third region of the minor cutting edge is formed in the intersection ridgeline portion between the planar portion and the flank.

In this manner, in the corner cutting edge where the clearance angle is the negative angle and in the portion where the clearance angle increases to the negative angle side toward the side of the corner cutting edge out of the major cutting edge and the minor cutting edge, the rake angle in the axial direction can increase to the positive angle side without greatly inclining the insert main body when the insert main body is attached to the tool main body. Therefore, sharper cutting quality can be ensured, and chip clogging can be prevented by reliably preventing the chip from being forcibly curled. On the other hand, in the third region where the clearance angle is the positive angle, the larger lip angle of the cutting edge can be secured, and the cutting edge strength can be reliably maintained.

Furthermore, on the side surface of the insert main body, a plurality of insert restriction surfaces extending in the direction of the insert center line in the cross section taken along the insert center line are formed between the flanks on the two polygonal surface sides, and the plurality of insert restriction surfaces are formed in mutually intersecting directions when viewed in the direction of the insert center line. In this manner, the rotation around the insert center line of the insert main body can be restricted by bringing the insert restriction surface into contact with the wall surface of the insert mounting seat, and the cutting can be more stably carried out.

On the other hand, similarly to the cutting insert disclosed in Patent Document 1, in a case where the insert main body has a triangular plate shape in which each of the two polygonal surfaces has three corner portions, it is desirable to adopt the following configuration. In the first region, when viewed from a direction facing the polygonal surface in the direction of the insert center line, a range of a nipping angle interposing the insert center line from a position where the clearance angle of the flank in the cross section taken along the insert center line starts to gradually decrease to the negative angle side from the wiper cutting edge toward the side of the one end of the corner cutting edge to a position where the clearance angle starts to increase to the positive angle side falls within a range of 50° to 65°.

In addition, in a case where the insert main body similarly has a triangular plate shape in which each of the two polygonal surfaces has three corner portions, it is desirable to adopt the following configuration. A range where the clearance angle of the flank in the cross section taken along the insert center line in the first region becomes the negative angle falls within a range where a nipping angle interposing the insert center line toward the side of the one end of the corner cutting edge from a position which bisects a cutting edge length of the wiper cutting edge is 20° to 70°, when viewed from a direction facing the polygonal surface in the direction of the insert center line.

Furthermore, in a case where the insert main body similarly has a triangular plate shape in which each of the two polygonal surfaces has three corner portions, it is desirable to adopt the following configuration. A range where the clearance angle of the flank in the cross section taken along the insert center line in the first region becomes the negative angle falls within a range where a nipping angle interposing the insert center line is 25° to 55°, when viewed from a direction facing the polygonal surface in the direction of the insert center line.

If each of the nipping angles is smaller than those within the above-described range, a ratio where the clearance angle gradually decreases in the first region is too high, and the flank is greatly twisted, and thus, the stress is concentrated on the cutting edge. Consequently, there is a possibility that damage or chipping is likely to occur. In addition, if each of the nipping angles is larger than those within the above-described range, conversely, the range of the nipping angles decreases in the region where the gradually decreased clearance angle increases again, thereby causing a possibility that the stress is likely to be concentrated on the cutting edge in the region. In a case where the insert main body has the triangular plate shape in which each of the two polygonal surfaces has three corner portions, it is more desirable to adopt the following configuration. The range where the clearance angle of the flank in the cross section taken along the insert center line in the first region is the negative angle falls within a range of 27° to 55°, as the range of the nipping angle interposes the insert center line when viewed in the direction facing the polygonal surface in the direction of the insert center line. It is much more desirable that the clearance angle fall within a range of 30° to 55°. However, the configuration is not limited thereto.

Advantageous Effects of Invention

As described above, according to the present invention, it is possible to ensure sharp cutting quality in the wiper cutting edge and the major cutting edge which are located on the inner peripheral side of the tool main body, thereby reliably suppressing an increase in the cutting resistance. It is possible to obtain excellent processing accuracy in the high-feed milling, and it is possible to prevent chip clogging. On the other hand, on the side of the corner cutting edge of the major cutting edge directed to the outer peripheral side of the tool main body, cutting edge strength can be sufficiently ensured, and chipping or damage can be prevented from occurring in the cutting edge.

DESCRIPTION OF EMBODIMENTS

Figure 10:
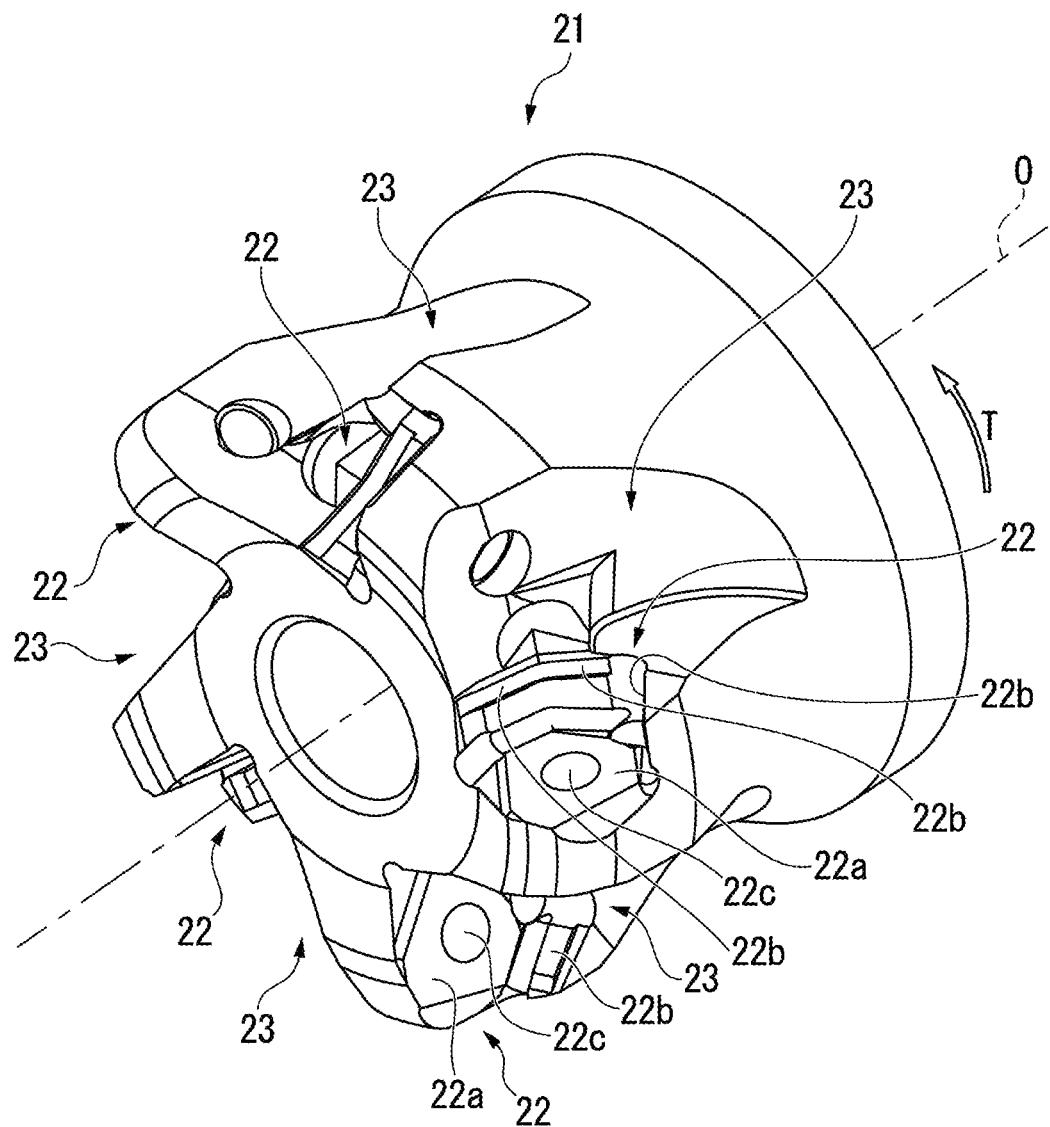
FIG. 10 is a perspective view of a tool main body of an indexable cutting tool to which the cutting insert according to the embodiment illustrated in FIG. 1 is detachably attached.
Figure 11:
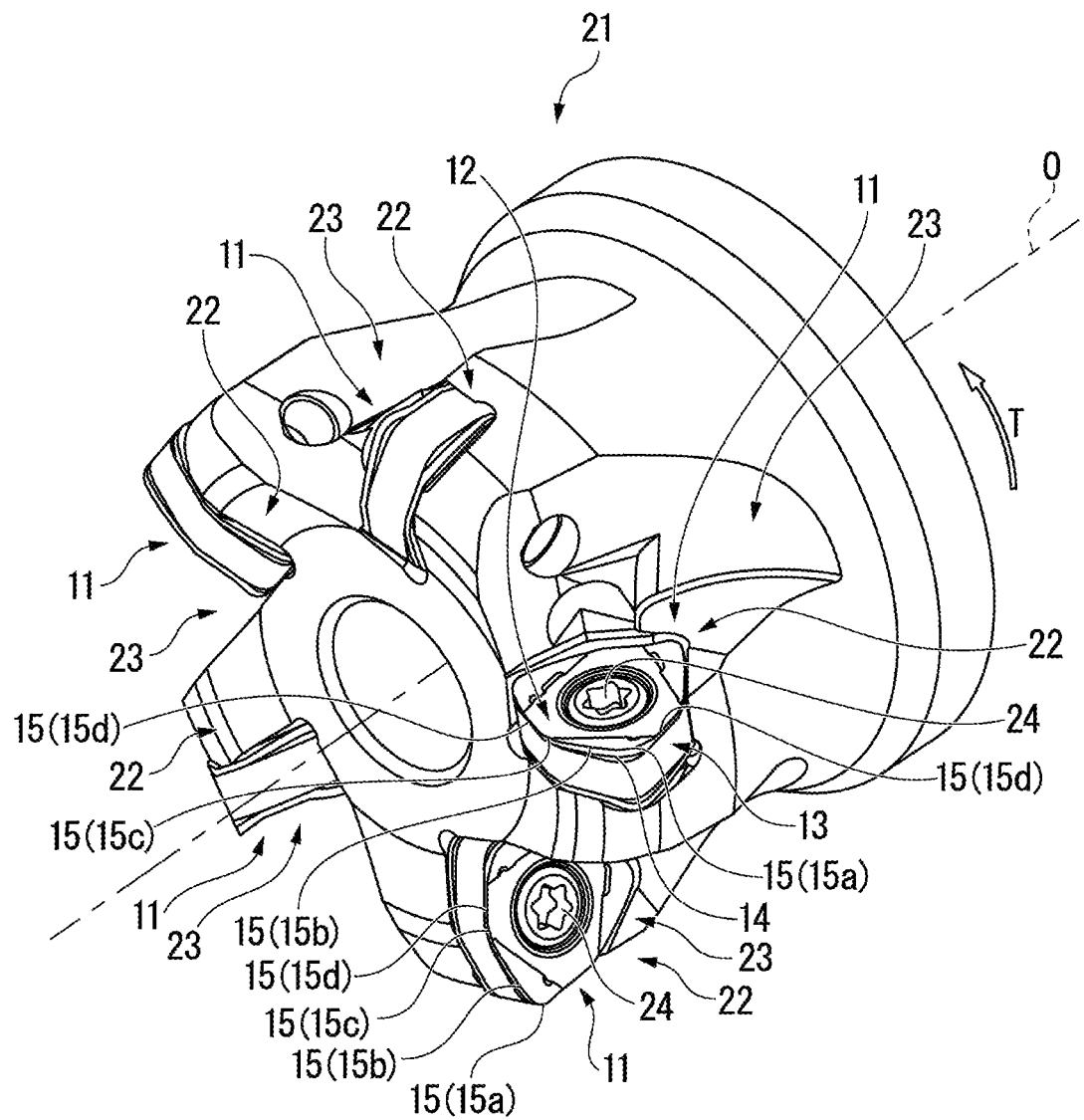
FIG. 11 is a perspective view of the indexable cutting tool in which the cutting insert according to the embodiment illustrated in FIG. 1 is detachably attached to the tool main body illustrated in FIG. 10.
Figure 12:
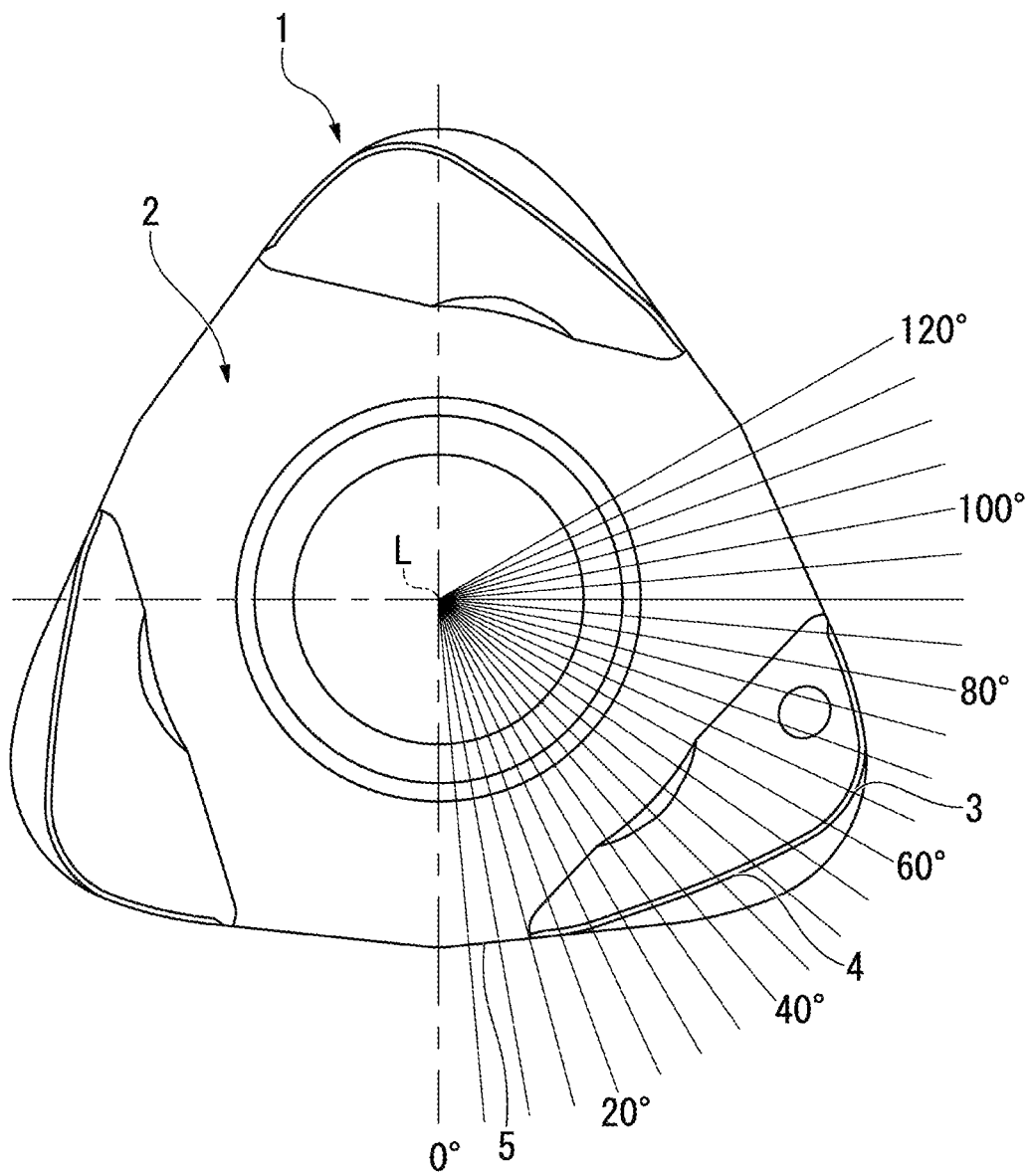
FIG. 12 is a plan view of a cutting insert disclosed in Patent Document 1.

FIGS. 1 to 10 illustrate an embodiment of a cutting insert according to the present invention. FIG. 10 illustrates a tool main body of an indexable cutting tool to which the cutting insert according to the present embodiment is detachably attached. FIG. 11 illustrates the embodiment of the indexable cutting tool according to the present invention in which the cutting insert of the above-described embodiment is detachably attached to the tool main body. The cutting insert according to the present embodiment includes an insert main body 11 having a polygonal plate shape formed of a hard material such as cemented carbide. The insert main body 11 has a triangular plate shape in which each of two polygonal surfaces 12 has three corner portions. The insert main body 11 has a rotationally symmetrical shape with respect to an insert center line L passing through a center of the two polygonal surfaces 12, and has a front-rear reversely symmetrical shape with respect to the two polygonal surfaces 12.

When the two polygonal surfaces 12 are attached to the tool main body 21 of the indexable cutting tool as illustrated in FIG. 11, one of the polygonal surfaces 12 serves as the rake face, and the other of the polygonal surfaces 12 serves as the seating surface for the insert mounting seat 22 formed in the tool main body 21. On a side surface 13 of the insert main body 11 located around the two polygonal surfaces 12, a flank 14 is formed which intersects the rake face of the two polygonal surfaces 12, and a cutting edge 15 is formed in an intersection ridgeline portion between the rake face (polygonal surface 12) and the flank 14. In a central portion of the two polygonal surfaces 12, a mounting hole 16 having a circular cross-sectional shape centered on the insert center line L for attaching the insert main body 11 to the insert mounting seat 22 is open by penetrating the insert main body 11 in the direction of the above-described insert center line L.

Figure 1:
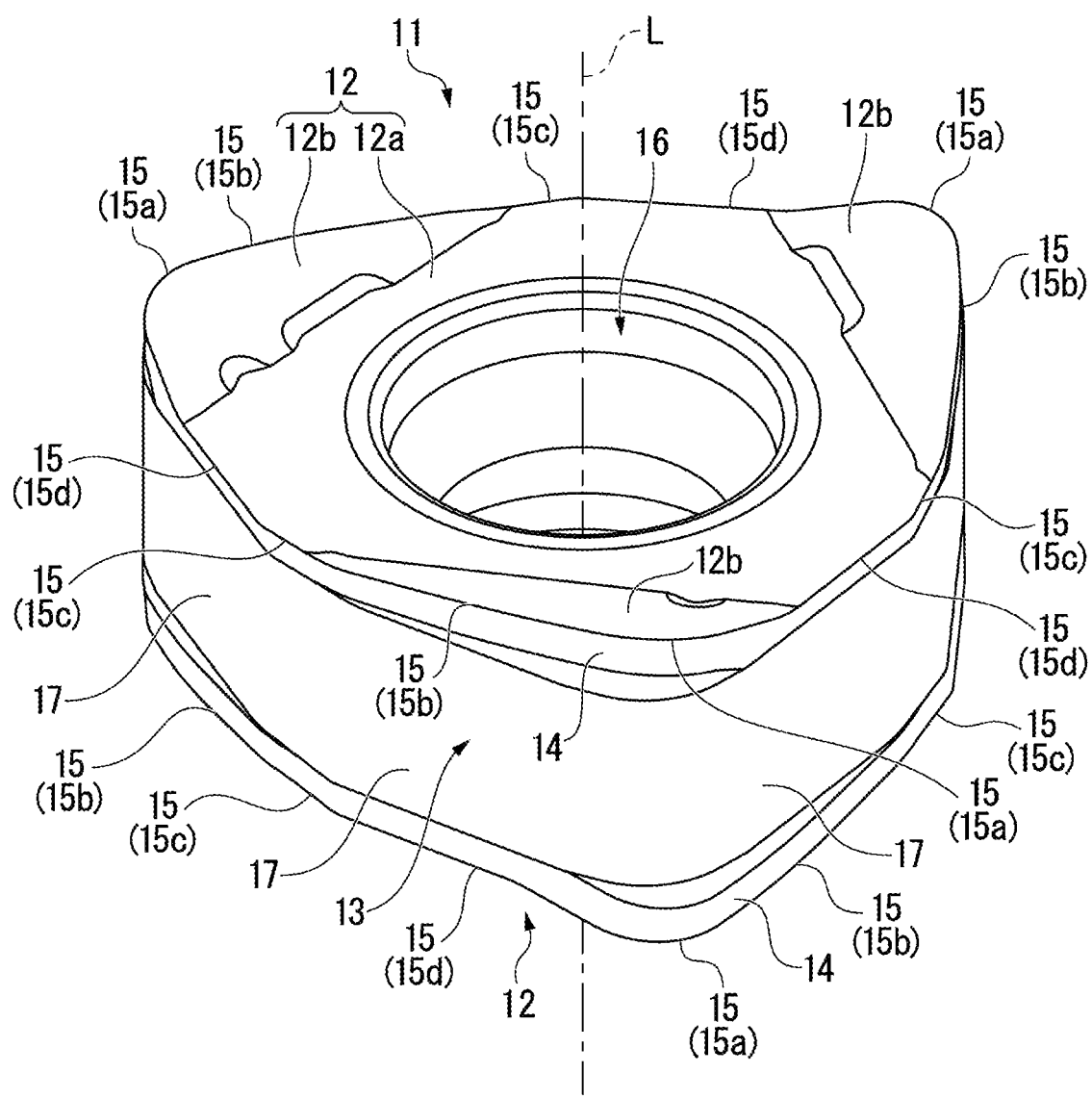
FIG. 1 is a perspective view illustrating an embodiment of a cutting insert according to the present invention.
Figure 2:
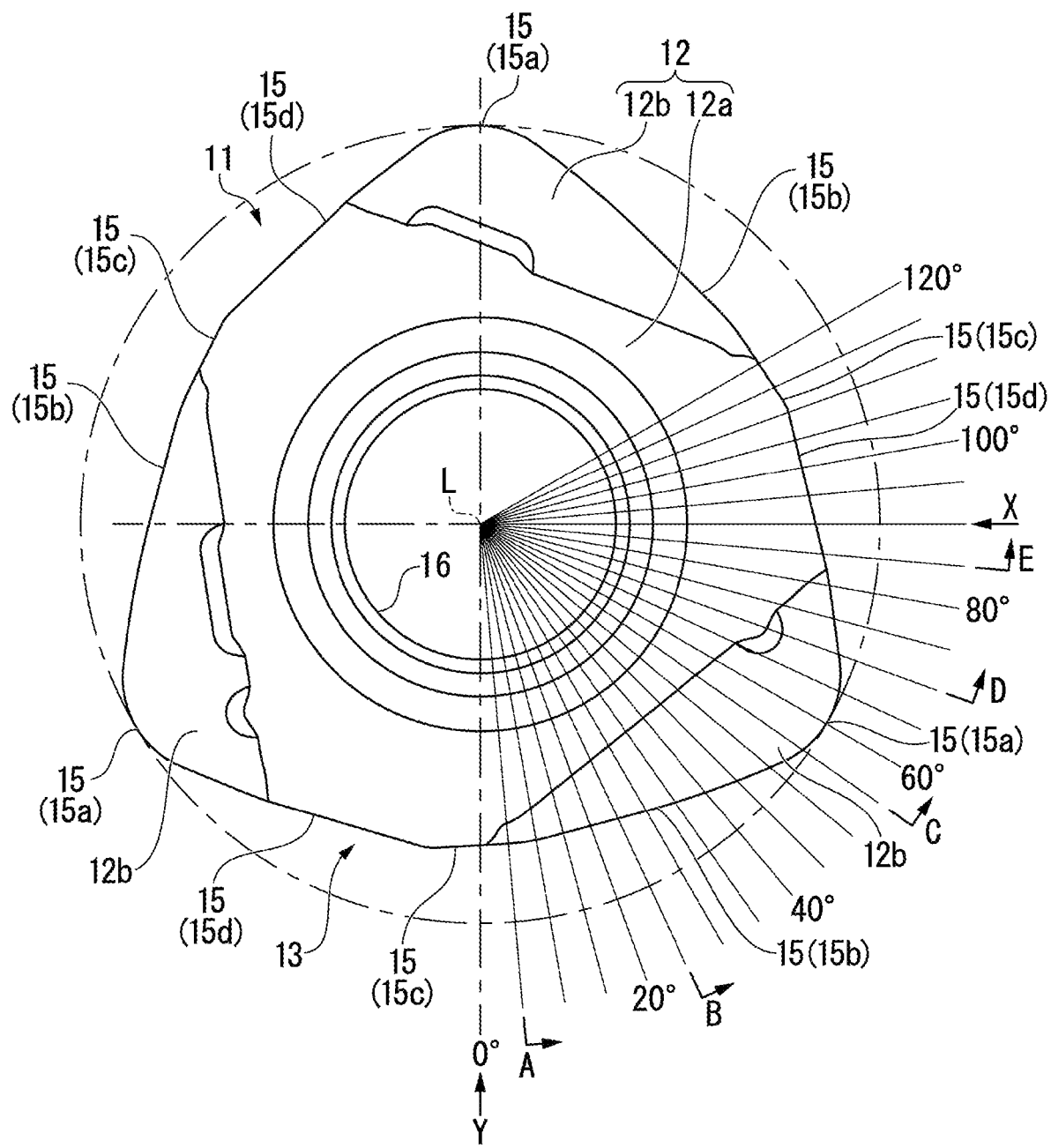
FIG. 2 is a plan view when the embodiment illustrated in FIG. 1 is viewed in a direction of an insert center line.
Figure 3:
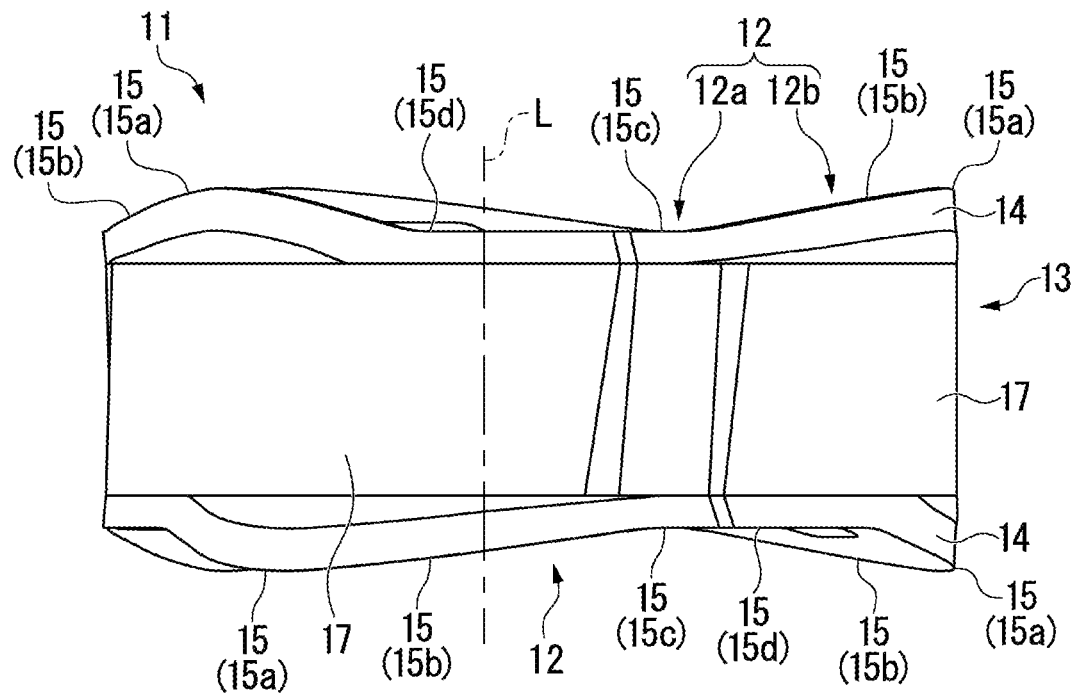
FIG. 3 is a side view when viewed in a direction of an arrow X in FIG. 2.
Figure 4:
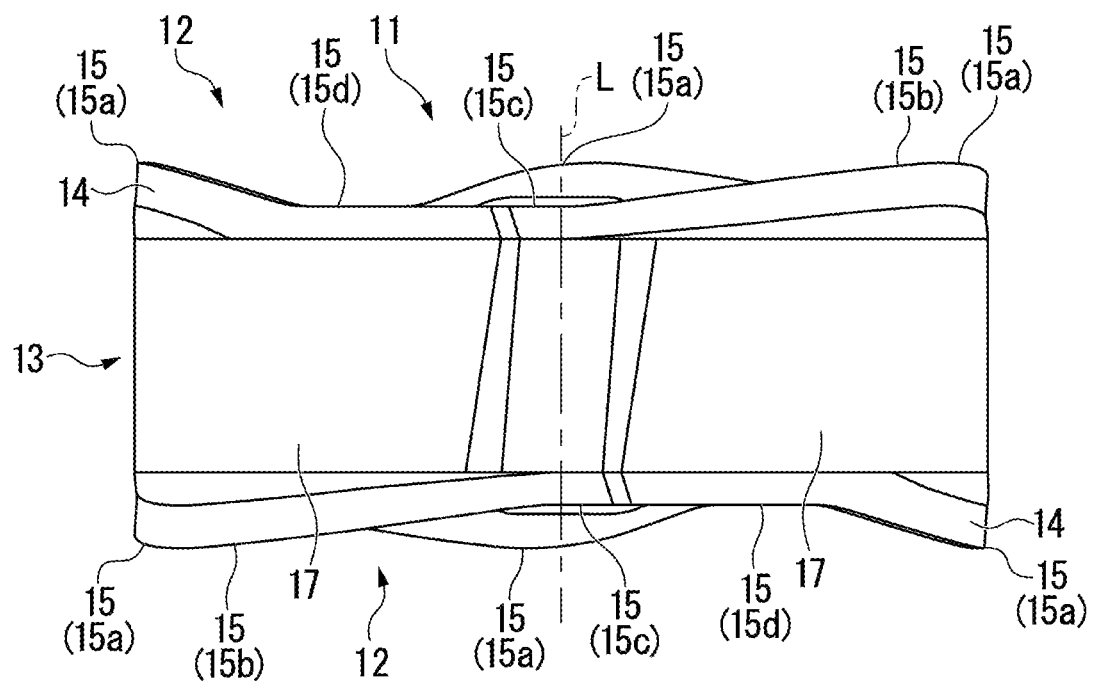
FIG. 4 is a side view when viewed in a direction of an arrow Y in FIG. 2.

When viewed in the direction of the insert center line L, the cutting edge 15 includes a corner cutting edge 15a formed in a concave curve shape such as an arc located in three corner portions of the polygonal surface 12, a major cutting edge 15b extending while being in contact with the corner cutting edge 15a from an one end (an end portion on a side in a clockwise direction around the insert center line L in FIG. 2) of the corner cutting edge 15a, and a wiper cutting edge 15c extending in a direction intersecting the major cutting edge 15b at an obtuse angle in an one end of the major cutting edge 15b. When viewed in the direction of the insert center line L, the major cutting edge 15b has a linear shape or a concave curve shape having a larger radius of curvature than the concave curve formed by the corner cutting edge 15a. The wiper cutting edge 15c has a linear shape or a concave curve shape having a larger radius of curvature than the concave curve formed by the major cutting edge 15b. In addition, the cutting edge 15 further includes a minor cutting edge 15d having a linear shape when viewed in the direction of the insert center line L and extending while being in contact with the corner cutting edge 15a from an other end of the corner cutting edge 15a. The minor cutting edge 15d extends in a direction intersecting the wiper cutting edge 15c of the other cutting edge 15 adjacent to a side of an other end (a side in a counterclockwise direction in FIG. 2) of one cutting edge 15, at the obtuse angle.

The flank 14 is formed in two edge portions on the polygonal surface 12 side of the side surface 13 of the insert main body 11, and between the flanks 14, a plurality of insert restriction surfaces 17 extending in the direction of the insert center line L in the cross section taken along the insert center line L are formed in the direction in which both of these intersect each other when viewed in the direction of the insert center line L. According to the present embodiment, the insert restriction surface 17 has a planar shape parallel to the insert center line L, and is formed inward in the direction of the insert center line L of the major cutting edge 15b and the minor cutting edge 15d. Portions located inward in the direction of the insert center line L of the corner cutting edge 15a between the adjacent insert restriction surfaces 17 are connected to each other using a convex surface.

In addition, on the polygonal surface 12 serving as the rake face, a planar portion 12a perpendicular to the insert center line L is formed around the opening portion of the mounting hole 16. The corner cutting edge 15a side has an inclined portion 12b inclined so as to protrude in the direction of the insert center line L as the inclined portion 12b is directed from the planar portion 12a toward the corner cutting edge 15a. According to the present embodiment, in the cutting edge 15, a total length of the corner cutting edge 15a and the major cutting edge 15b, a portion on a side where the wiper cutting edge 15c intersects the major cutting edge 15b, and a portion on a side where the minor cutting edge 15d comes into contact with the corner cutting edge 15a are formed in the intersection ridgeline portion between the inclined portion 12b and the flank 14. The remaining portion of the wiper cutting edge 15c and the minor cutting edge 15d is formed in the intersection ridgeline portion between the planar portion 12a and the flank 14. Therefore, in the cutting edge 15, the corner cutting edge 15a protrudes most in the direction of the insert center line L, gradually moves rearward in the direction of the insert center line L as the cutting edge 15 is separated from the corner cutting edge 15a along the major cutting edge 15b, the wiper cutting edge 15c, and the minor cutting edge 15d, and moves most rearward in the direction of the insert center line L from a position which approximately bisects the wiper cutting edge 15c to an intermediate portion of the minor cutting edge 15d.

Then, the above-described flank 14 includes a first region 14A in which a clearance angle θA of the flank 14 in the cross section taken along the insert center line L gradually decreases to the negative angle after continuously passing through 0° from the positive angle in a range leading to the major cutting edge 15b from the wiper cutting edge 15c toward the side of the one end of the corner cutting edge 15a. In the first region 14A, it is desirable that the clearance angle θA of the flank 14 in the cross section taken along the insert center line L gradually decrease within a range of +8° to −6°.

Figure 13:
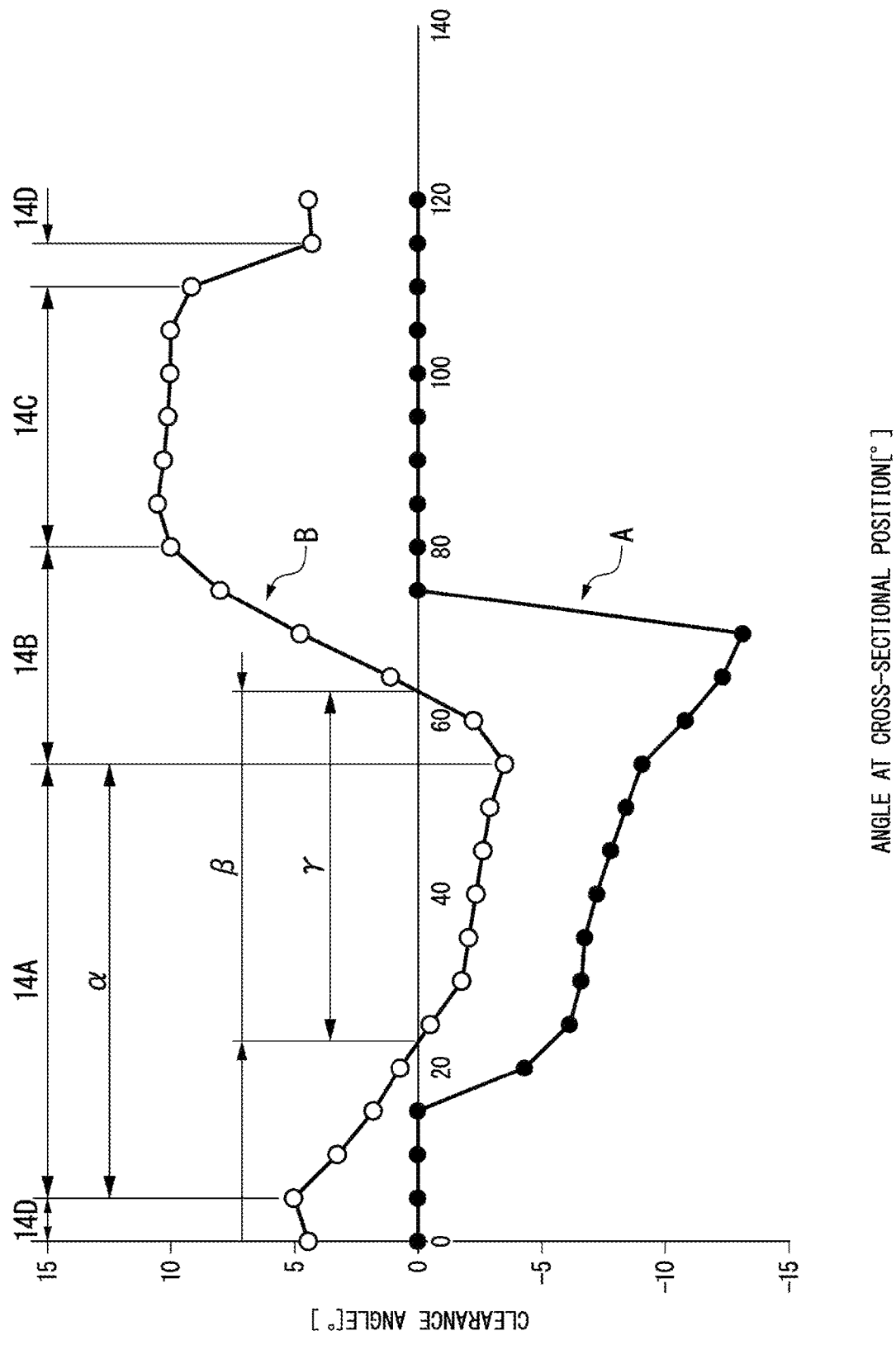
FIG. 13 is a view illustrating the cutting insert according to the embodiment illustrated in FIG. 1 and a clearance angle in a cross section taken along an insert center line of the cutting insert illustrated in FIG. 12.

Here, the reference numeral B in FIG. 13 described above indicates the following. A cross section passing through a position which bisects the cutting edge length of the wiper cutting edge 15c along the insert center line L in the cutting insert according to the present embodiment is set to a reference position of 0°. In this manner, the clearance angle is calculated for every 5° in the cross section taken along the insert center line L from the reference cross section to a position which bisects the cutting edge length of the wiper cutting edge 15c of the other cutting edge 15 located at a position of 120° in the counterclockwise direction around the insert center line L in FIG. 2. According to this configuration, in the present embodiment, the range where an angle of the cross-sectional position is 5° to 55° is the gradually decreasing region 14A of the clearance angle.

In addition, according to the present embodiment, in the minor cutting edge 15d, a range extending from the other end of the corner cutting edge 15a has a second region 14B in which a clearance angle θB of the flank 14 in the cross section taken along the insert center line L gradually increases to the positive angle side as the flank 14 is separated from the other end of the corner cutting edge 15a. Furthermore, a range from the second region 14B toward the other cutting edge 15 side has a third region 14C in which a clearance angle θC of the flank 14 in the cross section taken along the insert center line L is the positive angle and a change rate of the clearance angle θC for each unit nipping angle interposing the insert center line L is lower than that of the first region 14A and the second region 14B.

Therefore, referring to FIG. 13, according to the present embodiment, the range in which the angle of the cross-sectional position is approximately 55° to 80° or 85° serves as the second region 14B, and the range where the angle of the cross-sectional position is 80° or 85° to 110° serves as the third region 14C. Then, according to the present embodiment, a portion of the minor cutting edge 15d which is located in the second region 14B is formed in the intersection ridgeline portion between the inclined portion 12b and the flank 14 on the polygonal surface 12. On the other hand, a portion of the minor cutting edge 15d which is located in the third region 14C is formed in the intersection ridgeline portion between the planar portion 12a and the flank 14 on the polygonal surface 12.

As illustrated in FIG. 13, the clearance angle rapidly decreases from the third region 14C of the minor cutting edge 15d toward the wiper cutting edge 15c of the other cutting edge 15. In a region 14D of the wiper cutting edge 15c, a clearance angle θD is stabilized again in the range of the positive angle, and reaches the first region 14A of the other cutting edge 15. Therefore, the clearance angle θC of the flank 14 of the minor cutting edge 15d in the cross section taken along the insert center line L of the third region 14C is larger to the positive angle side than the clearance angle θD of the flank 14 of the region 14D of the wiper cutting edge 15c in the cross section taken along the insert center line L.

Here, in the third region 14C, it is desirable that the clearance angle θC of the flank 14 in the cross section taken along the insert center line L of the minor cutting edge 15d fall within a range of +6° to +15°. In addition, at the position which bisects the cutting edge length of the wiper cutting edge 15c (position where the angle of the cross-sectional position is the reference position of 0°), it is desirable that the clearance angle θD of the flank 14 in the cross section taken along the insert center line L fall within a range of +0.5° to +8°. It is desirable that the clearance angle θD be larger to the negative angle side than the clearance angle θC of the flank 14 in the cross section taken along the insert center line L of the minor cutting edge 15d.

In the cutting insert according to the present embodiment, the insert main body 11 has the triangular plate shape where each of the two polygonal surfaces 12 has the three corner portions. As illustrated in FIG. 13, it is desirable that the first region 14A fall within the following range. When viewed in the direction facing the polygonal surface 12 in the direction of the insert center line L, a range of a nipping angle α for interposing the insert center line L from a position where the clearance angle θA of the flank 14 in the cross section taken along the insert center line L starts to gradually decrease to the negative angle side from the wiper cutting edge 15c toward the side of the one end of the corner cutting edge 15a to a position where the clearance angle θA starts to increase to the positive angle side falls within a range of 50° to 65°.

In addition, in the cutting insert according to the present embodiment, the insert main body 11 has the triangular plate shape where each of the two polygonal surfaces 12 has the three corner portions. It is also desirable that a range where the clearance angle θB of the flank 14 in the cross section taken along the insert center line L in the first region 14A is the negative angle fall within a range where a nipping angle β for interposing the insert center line L from a position which intersects the cutting edge length of the wiper cutting edge 15c toward the side of the one end of the corner cutting edge 15a when viewed in the direction facing the polygonal surface 12 in the direction of the insert center line L is 20° to 70°.

Furthermore, in the cutting insert according to the present embodiment, the insert main body 11 has the triangular plate shape where each of the two polygonal surfaces 12 has the three corner portions. It is also desirable that a range where the clearance angle θA of the flank 14 in the cross section taken along the insert center line L in the first region 14A is the negative angle fall within a range where a nipping angle γ for interposing the insert center line L when viewed in the direction facing the polygonal surface 12 in the direction of the insert center line L is 25° to 55°.

Here, the insert main body 11 of the cutting insert formed of a hard material such as cemented carbide is manufactured in accordance with a basic process of a powder metallurgy technology. That is, in a case where the insert main body 11 is formed of cemented carbide, tungsten carbide powder and cobalt powder are used as main components, and if necessary, chromium or tantalum are used as minor components of granulated powder. In this manner, the granulated powder so as to perform powder press molding by using a mold. A press-formed body obtained in this way can be sintered for a predetermined time in a sintering furnace controlled to a proper atmosphere and temperature. In this manner, it is possible to manufacture a sintered body for the insert main body 11. A basic shape of the cutting insert is reflected by design of the mold, and a detailed shape of the cutting insert is obtained by molding. Furthermore, in order to achieve a very accurate cutting edge shape of the cutting insert, if necessary, grinding processing is performed using a grinding wheel, or cutting edge processing is performed using a brush containing hard abrasive grains. Alternatively, cutting edge processing is performed by a step of wet blasting using a free abrasive method, in some cases.

The cutting insert according to the present embodiment configured in this way is detachably attached to the insert mounting seat 22 formed in the tip outer periphery of the tool main body 21 of the indexable cutting tool as illustrated in FIG. 10, thereby configuring the indexable cutting tool according to the embodiment of the present invention as illustrated in FIG. 11. The tool main body 21 has a substantially cylindrical shape centered on an axis O. When cutting is carried out, the rear end portion is gripped by a main shaft of a machine tool, and is rotated in a tool rotation direction T around the axis O. The cutting is carried out for a work material by the cutting insert.

In the present embodiment, in an extending direction of the axis O, a direction closer to the insert mounting seat 22 in the tool main body 21 (direction from an upper right side to a lower left side in FIGS. 10 and 11) will be referred to as a tip side, and a direction away from the insert mounting seat 22 in the tool main body 21 (direction from the lower left side to the upper right side in FIGS. 10 and 11) will be referred to as a rear end side. In addition, a direction orthogonal to the axis O will be referred to as a radial direction. Furthermore, a direction close to the axis O in the radial direction will be referred to as an inner peripheral side, and a direction away from the axis O will be referred to as an outer peripheral side.

A plurality of (five in the present embodiment) chip pockets 23 are formed in the tip outer periphery of the tool main body 21, and the insert mounting seat 22 is formed in the tip outer periphery of the wall surface directed in the tool rotation direction T of the chip pocket 23. The insert mounting seat 22 includes a planar bottom surface 22a directed in the tool rotation direction T, and a plurality of planar wall surfaces 22b arranged at an interval from the bottom surface 22a on a side in tool rotation direction T and capable of coming into contact with the insert restriction surface 17 of the insert main body 11. The bottom surface 22a has a screw hole 22c into which a clamp screw 24 inserted into the mounting hole 16 is screwed.

The cutting insert according to the present embodiment is mounted on the insert mounting seat 22 as follows. One polygonal surface 12 of the insert main body 11 serves as the rake face, and is directed to the side in the tool rotation direction T. The planar portion 12a of the other polygonal surface 12 is brought into close contact with the bottom surface 22a of the insert mounting seat 22. Furthermore, the insert main body 11 is fixed as follows. The corner cutting edge 15a located in one corner portion of the one polygonal surface 12 is caused to protrude to the outer peripheral side of the tool main body 21, and the major cutting edge 15b extending from the one end of the corner cutting edge 15a is directed to the tip side of the tool main body 21, and the wiper cutting edge 15c extending from the one end of the major cutting edge 15b is located so that the concavity angle is 2° or smaller with respect to a plane perpendicular to the axis O. The clamp screw 24 inserted into the mounting hole 16 is screwed into the screw hole 22c. That is, the wiper cutting edge 15c is located along the plane perpendicular to the axis O, or is inclined and located so as to face the rear end side toward the inner peripheral side of the tool main body 21 at an angle of 2° or smaller with respect to the plane. In this case, the insert restriction surface 17 of the side surface 13 connected to the cutting edge 15 which is not used for the cutting is brought into contact with the wall surface 22b of the insert mounting seat 22, thereby restricting the rotation of the insert main body 11 around the insert center line L.

In this way, the indexable cutting tool having the cutting insert attached thereto is fed in the direction perpendicular to the axis O while being rotated around the axis O when normal cutting is carried out, and the work material is cut by the corner cutting edge 15a protruding to the outer peripheral side of the tool main body 21, and the major cutting edge 15b and the wiper cutting edge 15c which are connected to the one end of the corner cutting edge 15a. The major cutting edge 15b has a linear shape or a concave curve shape having a larger radius of curvature than the corner cutting edge 15a. Accordingly, the thickness of the chip generated by the inner peripheral side portion of the tool main body 21 including the wiper cutting edge 15c is thin. Even if the tool main body 21 is fed at a high feed rate, an increase in the cutting resistance can be suppressed.

Figure 5:
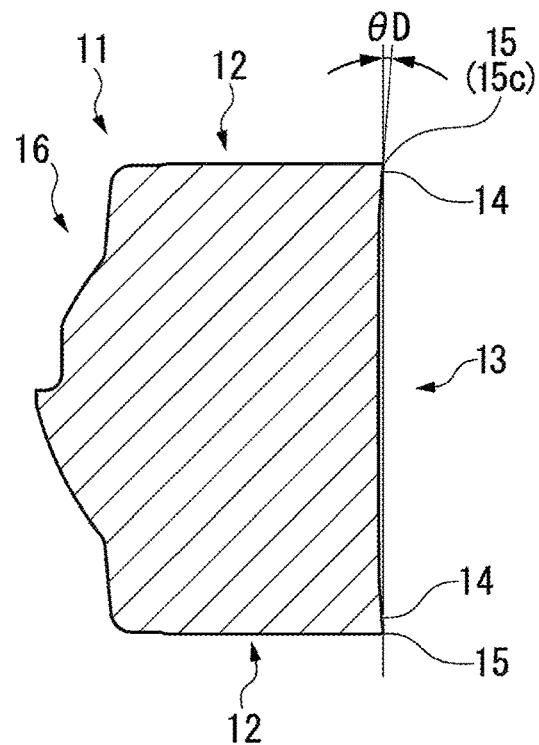
FIG. 5 is a sectional view taken along line AL in FIG. 2.

Then, furthermore, in the cutting insert and the indexable cutting tool according to the above-described configuration, the range leading to the major cutting edge 15b from the wiper cutting edge 15c of the cutting insert toward the side of the one end of the corner cutting edge 15a has the first region 14A where the clearance angle θA of the flank 14 in the cross section taken along the insert center line L gradually decreases to the negative angle after continuously passing through 0° from the positive angle. Therefore, until the clearance angle θA becomes 0° in the first region 14A, the clearance angle θA in the cross section taken along the insert center line L of the wiper cutting edge 15c and the major cutting edge 15b is the positive angle. That is, as illustrated in FIG. 5, in the cross section, the flank 14 is inclined so as to gradually move rearward with respect to a straight line parallel to the insert center line L passing through the cutting edge 15 as the flank 14 is away from the cutting edge 15.

Therefore, even in a case where one polygonal surface 12 serving as the rake face of the insert main body 11 is inclined to the side in the tool rotation direction T as one polygonal surface 12 is directed toward the rear end side of the tool main body 21 from the major cutting edge 15b and the wiper cutting edge 15c in order to prevent interference between the flank 14 and the processing surface of the work material, the interference can be prevented without greatly inclining the one polygonal surface 12. Therefore, it is possible to ensure sharp cutting quality in the major cutting edge 15b and the wiper cutting edge 15c, and it is possible to reliably prevent an increase in the cutting resistance. The chip is not forcibly curled. Accordingly, it is possible to prevent chip clogging. Moreover, according to the present embodiment, the major cutting edge 15b and the portion of the wiper cutting edge 15c on the major cutting edge 15b are formed in the inclined portion 12b of the polygonal surface 12. Therefore, the cutting resistance can be further reduced.

Figure 6:
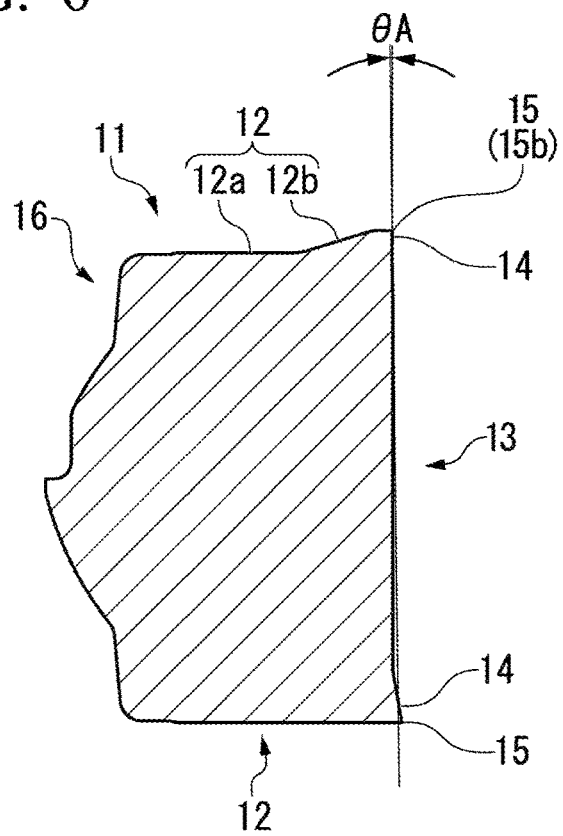
FIG. 6 is a sectional view taken along line BL in FIG. 2.
Figure 7:
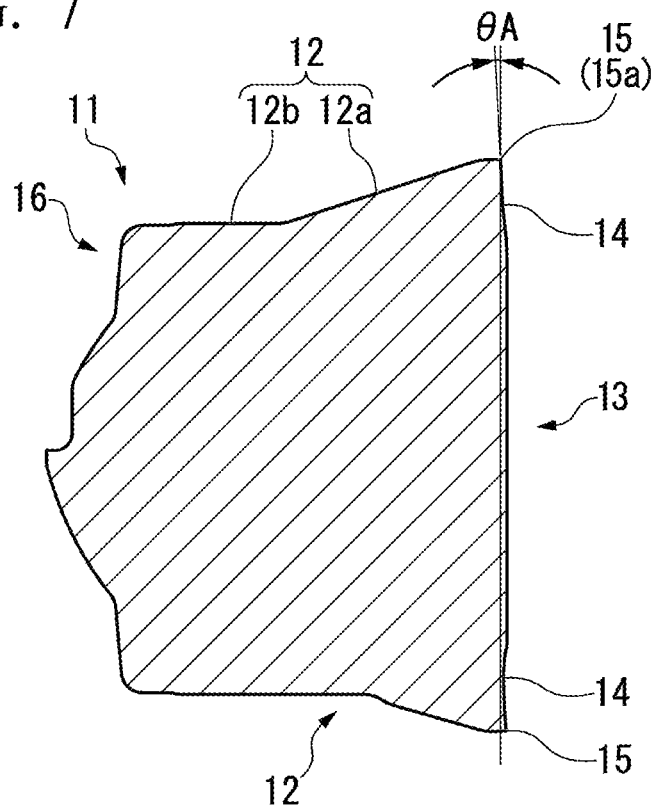
FIG. 7 is a sectional view taken along line CL in FIG. 2.
Figure 8:
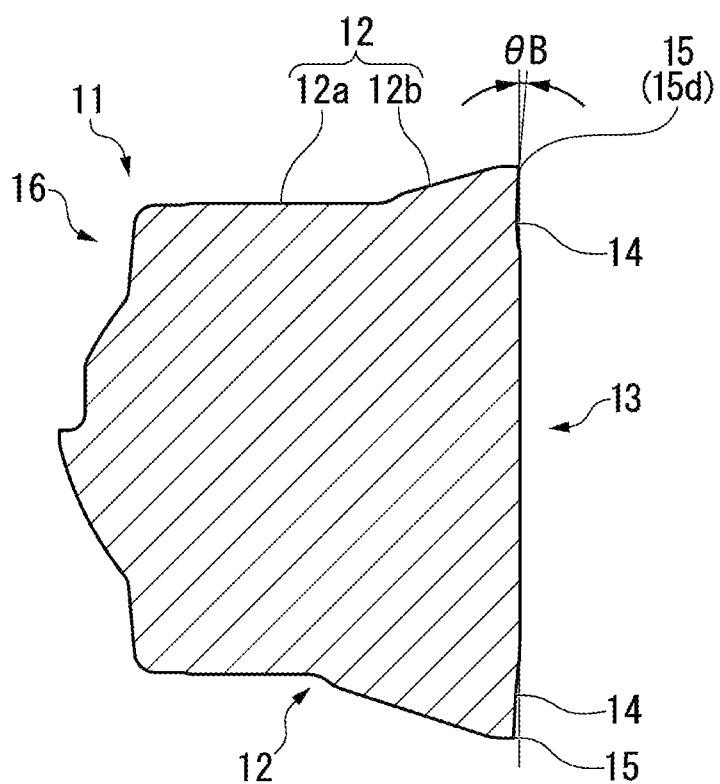
FIG. 8 is a sectional view taken along line DL in FIG. 2.
Figure 9:
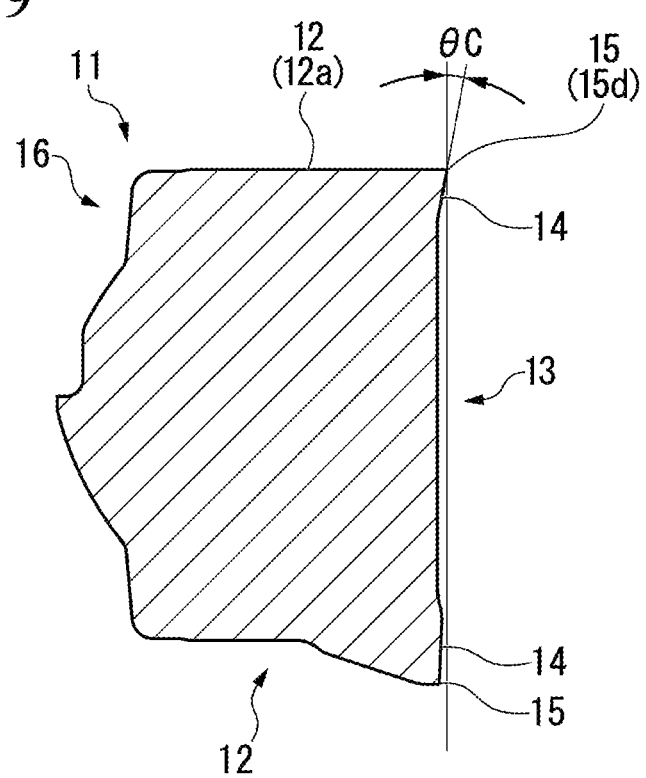
FIG. 9 is a sectional view taken along line EL in FIG. 2.

On the other hand, a thick chip is generated from the outer peripheral side of the tool main body 21 of the major cutting edge 15b to the corner cutting edge 15a, and a heavy cutting load acts on the cutting edge 15. However, in contrast, in the cutting insert and the indexable cutting tool according to the above-described configuration, the clearance angle θA of the flank 14 is the negative angle around the corner cutting edge 15a side of the major cutting edge 15b and the corner cutting edge 15a. That is, as illustrated in FIGS. 6 and 7, the flank 14 is inclined so as to gradually protrude with respect to a straight line parallel to the insert center line L passing through the cutting edge 15 in the cross section taken along the insert center line L as the flank 14 is away from the cutting edge 15. Therefore, the lip angle of the cutting edge 15, that is, an intersection angle formed between the rake face and the flank 14 can be largely secured. The cutting edge strength can be maintained against a heavy the cutting load as described above, and it is possible to prevent chipping or damage from occurring in the cutting edge 15.

In the first region 14A, it is desirable that the clearance angle θA of the flank 14 in the cross section taken along the insert center line L gradually decrease within a range of +8° to −6°. In addition, at the position which bisects the cutting edge length of the wiper cutting edge 15c, it is desirable that the clearance angle θD of the flank 14 in the cross section taken along the insert center line L fall within a range of +0.5° to +8°. If the clearance angle θA of the cutting edge 15 or the clearance angle θD of the wiper cutting edge 15c in the first region 14A is larger to the positive angle side than the above-described range, the lip angle of the cutting edge 15 decreases, thereby causing a possibility that chipping or damage may be likely to occur. On the other hand, conversely, if the clearance angle θA of the cutting edge 15 in the first region 14A or the clearance angle θD of the wiper cutting edge 15c in the first region 14A is larger to the negative angle side than the above-described range, unless the insert main body 11 is greatly inclined, there is a possibility that interference between the flank 14 and the work material may not be prevented. In the first region 14A, it is more desirable that the clearance angle θA of the flank 14 in the cross section taken along the insert center line L gradually decrease within a range of +7° to −5°, and it is much more desirable that the clearance angle θA gradually decrease within a range of +6° to −4°. However, the configuration is not limited thereto. Similarly, at the position which bisects the cutting edge length of the wiper cutting edge 15c, it is more desirable that the clearance angle θD of the flank 14 in the cross section taken along the insert center line L fall within a range of +0.5° to +7°, and it is much more desirable that the clearance angle θD fall within a range of +0.5° to +6°. However, the configuration is not limited thereto.

In addition, the indexable cutting tool having this cutting insert attached thereto is used in performing the cutting in which the tool main body 21 is fed in the direction perpendicular to the axis O. In addition to the cutting, the indexable cutting tool is also used for ramping milling in which the work material is engraved by feeding the tool main body 21 to the tip side in the direction of the axis O. Then, in this case, a portion of the minor cutting edge 15d on the inner peripheral side of the tool main body 21 located further from the wiper cutting edge 15c directed to the tip side of the tool main body 21 is also used for the cutting.

In contrast, in the cutting insert and the indexable cutting tool according to the present embodiment, the cutting edge 15 further includes the minor cutting edge 15d extending from the other end of the corner cutting edge 15a in the direction intersecting the wiper cutting edge 15c of the other cutting edge 15 adjacent to the side of the other end of the corner cutting edge 15a at the obtuse angle. Then, the range extending from the other end of the corner cutting edge 15a in the minor cutting edge 15d has the second region 14B in which the clearance angle θB of the flank 14 in the cross section taken along the insert center line L as the flank 14 is away from the other end of the corner cutting edge 15a gradually increases to the positive angle side. The range from the second region 14B toward the cutting edge 15 side has the third region 14C in which the clearance angle θC of the flank 14 in the cross section taken along the insert center line L is the positive angle and the change rate of the clearance angle θC for each unit nipping angle interposing the insert center line L is lower than that of the first region 14A and the second region 14B.

Therefore, in the minor cutting edge 15d used for the ramping milling while being adjacent to the inner peripheral side of the wiper cutting edge 15c directed to the tip side of the tool main body 21, the clearance angle θC in the third region 14C is the positive angle, and the change rate is minimized and stabilized. Accordingly, even in a case of being used for the ramping milling, the insert main body 11 does not need to be greatly inclined so as to be attached to the tool main body 21. The cutting resistance can be reduced, and chip clogging can be prevented.

In addition, in a case where the third region 14C is provided in this way, according to the present embodiment, the clearance angle θD of the flank 14 in the cross section taken along the insert center line L of the wiper cutting edge 15c is caused to be larger to the negative angle side than the clearance angle θC of the flank 14 of the minor cutting edge 15d in the cross section taken along the insert center line L in the third region 14C. In this manner, chipping or damage can be prevented by sufficiently securing the lip angle for the wiper cutting edge 15c. It is desirable that the clearance angle θC of the flank 14 in the cross section taken along the insert center line L of the minor cutting edge 15d fall within a range of +6° to +15°. In particular, if the clearance angle θC exceeds +15°, stress is concentrated on the portion intersecting the wiper cutting edge 15c at the obtuse angle, and thus, chipping or damage is likely to occur. Accordingly, it is not preferable. It is more desirable that the clearance angle θC of the flank 14 in the cross section taken along the insert center line L of the minor cutting edge 15d fall within a range of +7° to +14°, and much more preferable that the clearance angle θC fall within a range of +8° to +13°. However, the configuration is not limited thereto.

Furthermore, according to the present embodiment, the portion intersecting the wiper cutting edge 15c in the minor cutting edge 15d is formed in the intersection ridgeline portion between the third region 14C of the flank 14 and the planar portion 12a perpendicular to the insert center line L on the polygonal surface 12. Therefore, even in the third region 14C where the clearance angle θC becomes largest to the positive angle side, the lip angle of the minor cutting edge 15d can be largely secured, and the cutting edge strength can be reliably maintained. Therefore, it is possible to prevent chipping or damage from occurring.

In addition, in the cutting insert according to the present embodiment, between the flanks 14 on the two polygonal surfaces 12 side on the side surface 13 of the insert main body 11, the plurality of insert restriction surfaces 17 extending in the direction of the insert center line L in the cross section taken along the insert center line L are formed in the mutually intersecting directions when viewed in the direction of the insert center line L. Therefore, as described above, the rotation of the insert main body 11 around the insert center line L can be restricted by bringing the insert restriction surface 17 into contact with the wall surface 22b of the insert mounting seat 22. Therefore, the cutting can be more stably carried out.

Furthermore, in the cutting insert according to the present embodiment, the insert main body 11 has the triangular plate shape. In contrast, the first region 14A falls within the following range. When viewed in the direction facing the polygonal surface 12 in the direction of the insert center line L, the range of the nipping angle α for interposing the insert center line L from the position where the clearance angle θA of the flank 14 in the cross section taken along the insert center line L starts to gradually decrease to the negative angle side from the wiper cutting edge 15c toward the side of the one end of the corner cutting edge 15a to the position where the clearance angle θA starts to increase to the positive angle side falls within the range of 50° to 65°. Therefore, in the first region 14A, there is no possibility that the clearance angle θa may be rapidly changed and the flank 14 may be greatly twisted. In this manner, it is possible to prevent a possibility that chipping or damage may be likely to occur due to the stress concentrated on the cutting edge 15.

In addition, similarly, in the cutting insert according to the present embodiment in which the insert main body 11 has the triangular plate shape, the range where the clearance angle θA of the flank 14 in the cross section taken along the insert center line L in the first region 14A is the negative angle falls within the range where the nipping angle β for interposing the insert center line L from the position which bisects the cutting edge length of the wiper cutting edge 15c toward the side of the one end of the corner cutting edge 15a when viewed in the direction facing the polygonal surface 12 in the direction of the insert center line L is 20° to 70°. Therefore, this configuration also prevents the flank 14 from being greatly twisted, and the stress concentration on the cutting edge 15 can be alleviated.

Furthermore, according to the present embodiment, the range where the clearance angle θA of the flank 14 in the cross section taken along the insert center line L in the first region 14A is the negative angle falls within the range where the nipping angle γ for interposing the insert center line L when viewed in the direction facing the polygonal surface 12 in the direction of the insert center line L is 25° to 55°. This configuration can also prevent the stress concentration on the cutting edge 15. If the nipping angles α, β, and γ are larger than the above-described range, the range of the second region 14B decreases, thereby causing a possibility that the flank 14 of the minor cutting edge 15d may be greatly twisted. It is more desirable that the range where the clearance angle θA of the flank 14 in the cross section taken along the insert center line L in the first region 14A is the negative angle fall within the range where the nipping angle γ for interposing the insert center line L when viewed in the direction facing the polygonal surface 12 in the direction of the insert center line L is 27° to 55°, and it is much more desirable that the nipping angle γ be within the range of 30° to 55°. However, the configuration is not limited thereto.

INDUSTRIAL APPLICABILITY

According to the present invention, it is possible to ensure sharp cutting quality in the wiper cutting edge and the major cutting edge which are located on the inner peripheral side of the tool main body, thereby reliably suppressing an increase in the cutting resistance. It is possible to obtain excellent processing accuracy in the high-feed milling, and it is possible to prevent chip clogging. On the other hand, on the side of the corner cutting edge of the major cutting edge directed to the outer peripheral side of the tool main body, the cutting edge strength can be sufficiently ensured, and chipping or damage can be prevented from occurring in the cutting edge.

REFERENCE SIGNS LIST

11: insert main body
12: polygonal surface
12a: planar portion
12b: inclined portion
13: side surface
14: flank
14A: first region (gradually decreasing region of clearance angle)
14B: second region (gradually increasing region of clearance angle)
14C: third region (stable region of clearance angle)
14D: region of wiper cutting edge 15c
15: cutting edge
15a: corner cutting edge
15b: major cutting edge
15c: wiper cutting edge
15d: minor cutting edge
16: mounting hole
17: insert restriction surface
21: tool main body
22: insert mounting seat
23: chip pocket
24: clamp screw
L: insert center line
θA: clearance angle in first region 14A
θB: clearance angle in second region 14B
θC: clearance angle in third region 14C
θD: clearance angle in region of wiper cutting edge 15c
O: axis of tool main body 21
T: tool rotation direction

The invention claimed is:

1. A cutting insert, comprising:
a polygonal plate-shaped insert main body having:
two polygonal surfaces, one of the two polygonal surfaces serving as a seating surface when the other of the two polygonal surfaces serves as a rake face,
a side surface located around the two polygonal surfaces, the side surface having
a flank which intersects the rake face, and
a plurality of planar restriction surfaces parallel to an insert center line passing through a respective center of the two polygonal surfaces, an insert mid-plane perpendicular to the insert center line intersects the plurality of planar restriction surfaces, and
a cutting edge formed in an intersection ridgeline portion between the rake face and the flank,
wherein the insert main body has a rotationally symmetrical shape with respect to the insert center line passing through the respective center of the two polygonal surfaces, and the two polygonal surfaces have a same shape,
wherein the cutting edge includes edge sets, and each of the edge sets includes:
a corner cutting edge, a major cutting edge, and a wiper cutting edge,
the corner cutting edge is located in a corner portion of the polygonal surface serving as the rake face,
the major cutting edge extends from, and is directly connected to, one end of the corner cutting edge, and
the wiper cutting edge extends from one end of the major cutting edge at a first internal obtuse angle in a plan view of the polygonal surface serving as the rake face,
wherein each of the edge sets further includes a minor cutting edge at an other end of the corner cutting edge opposite the one end of the corner cutting edge, and the minor cutting edge of one edge set and the wiper cutting edge of an adjacent edge set, directly connected to the minor cutting edge of the one edge set, form a second internal obtuse angle,
wherein the flank has clearance angles, the clearance angles are formed by the flank and a respective straight line parallel to the insert center line and passing through the cutting edge,
wherein in each of the edge sets, the flank includes:
a first region spanning the major cutting edge,
a second region including the corner cutting edge and part of the minor cutting edge extending from the other end of the corner cutting edge, and
a third region in a remaining range of the minor cutting edge extending from an end of the second region, the third region being further from the corner cutting edge than the second region,
wherein in the first region in a direction from a bisector of the wiper cutting edge toward the one end of the corner cutting edge, the clearance angles gradually decrease to a negative angle value from a first positive angle value,
wherein in the second region, the clearance angles gradually increase from the negative angle value to a second positive angle value,
wherein in the third region, the clearance angles have a respective positive value and vary so that a change rate of the clearance angles in the third region is lower than a respective change rate of the clearance angles in the first region and the second region.

2. The cutting insert according to claim 1,
wherein the clearance angles of the flank in the third region are larger than the clearance angles of the flank in the wiper edge.

3. The cutting insert according to claim 1,
wherein the polygonal surface serving as the rake face has:
a planar portion perpendicular to the insert center line, and
inclined portions inclined so as to protrude in a direction parallel to the insert center line, as each of the inclined portions is directed from the planar portion toward each respectively closest corner cutting edges,
wherein in each cutting edge set, the corner cutting edge, the major cutting edge, and a portion located in the second region of the minor cutting edge is formed in the intersection ridgeline portion between the inclined portions and the flank, and
wherein a portion of the minor cutting edge located in the third region is formed in the intersection ridgeline portion between the planar portion and the flank.

4. The cutting insert according to claim 1,
wherein in the third region, the clearance angles of the flank are within a range of +6° to +15°.

5. The cutting insert according to claim 1,
wherein in the first region, the clearance angles of the flank gradually decrease within a range of +8° to −6°.

6. The cutting insert according to claim 1,
wherein at a position which bisects a cutting edge length of the wiper cutting edge, the clearance angle of the flank is within a range of +0.5° to +8°.

7. The cutting insert according to claim 1,
wherein the insert main body has a triangular shape in which each of the two polygonal surfaces has three corner portions.

8. An indexable cutting tool, comprising:
the cutting insert according to claim 1,
wherein the cutting insert is detachably attached to an insert mounting seat formed in a tip outer periphery of a tool main body rotating around an axis, and
wherein an active wiper cutting edge extends at an angle of 2° or smaller with respect to a plane perpendicular to the axis.

9. The cutting insert according to claim 1, wherein the third region extends between the second region and the wiper cutting edge of the adjacent edge set.

* * * * *